Patented Jan. 16, 1951

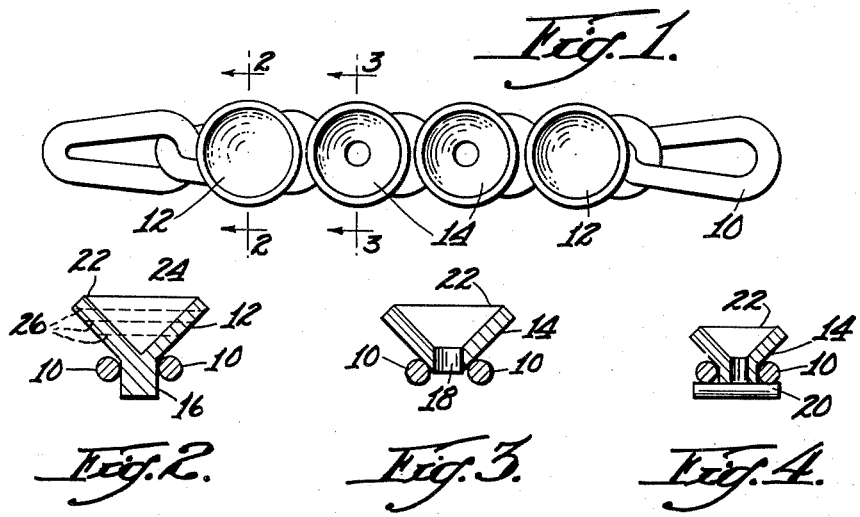
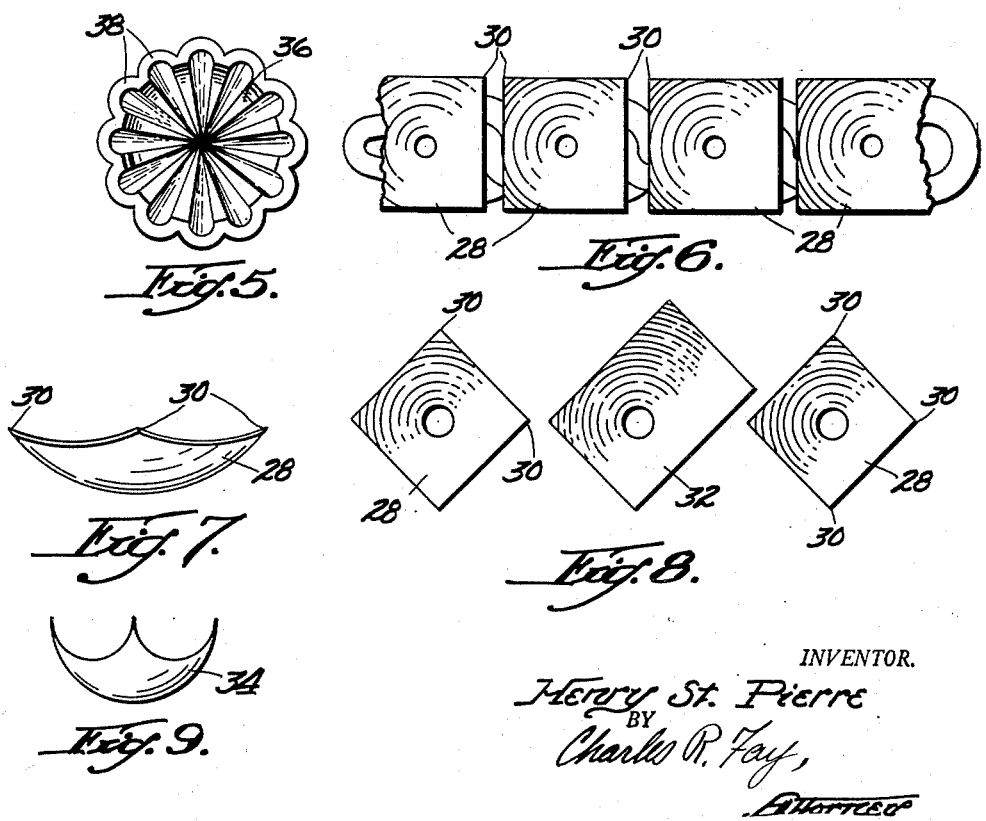

2,538,046

UNITED STATES PATENT OFFICE 2,538,046

CROSS CHAIN FOR TIRE CHAINS

Henry St. Pierre, Worcester, Mass.

Application March 3, 1948, Serial No. 12,715

3 Claims. (Cl. 152—245)

This invention relates to new and improved cross chains for tire chains and the principal object of the invention resides in the provision of new and improved means for gripping the ground better and for making the chain last longer.

Another object of the invention resides in the provision of dished-out or cup-shaped devices which are secured as by welding or other means to the individual links of a cross chain, said devices presenting sharp rims faced outwardly therefrom to act as the ground engaging parts thereof, said rims to matter how badly worn always presenting a continuous sharp edge to engage the ground.

Further objects of the invention include the provision of square, rectangular and similar shaped dished ground engaging elements presenting points to engage the ground and dig thereinto, said square or rectangular elements also having the property of presenting sharp points regardless of to what degree the same are worn down by abrasive action with the ground.

A still further object of the invention resides in the provision of dished, pressed-metal square or similar shaped elements to be secured at their convex sides to the separate links of cross chains, so as to provide ground engaging long lasting heat treatable elements which, however, are inexpensive to manufacture and assemble.

A still further object of the invention resides in the provision of cup-shaped devices having solid parts thereof extending through the runs of the separate links and being welded thereto and forming bars securely fixing the elements to the links; and the provision of conical apically apertured ground engaging devices secured to chain links for the purpose described.

Other objects and advantages of the invention will appear hereinafter.

Reference is to be had to the accompanying drawings in which Fig. 1 is a view in elevation showing one form of the invention; Fig. 2 is a section on line 2—2 of Fig. 1; Fig. 3 is a section on line 3—3 of Fig. 1; Fig. 4 is a section through a modification of the device shown in Fig. 3; Fig. 5 is an enlarged view in elevation of a modified ground engaging element; Fig. 6 is a view in elevation showing dished ground engaging elements square in shape; Fig. 7 is an enlarged edge view of one of the elements of Fig. 6; Fig. 8 is a view similar to Fig. 6 but showing a different arrangement of the ground engaging elements; and Fig. 9 is an edge view of a more deeply dished ground engaging element.

As shown in Fig. 1, a cross chain is indicated at 10 and this cross chain as is usual consists of a number of interconnected links which are adapted to extend from side chain to side chain of a tire chain for vehicles. In most cases, the links 10 will be twisted but this is not essential to the present invention.

A case hardened chain consisting merely of the links 10 has been found to be simple and effective but it has also been found that a much more effective chain and a much longer lasting chain can be made by securing pieces across the runs of the individual links 10 in the manner of the well known "bar-reinforced" tire chain.

In the present case, however, there is provided a series of generally conical shaped dished cup-like elements 12 and 14, which are adapted to be welded to the side runs of the links 10, as indicated in Fig. 2. The elements 12 are solid and each is provided with an apical projection 16 extending between the runs of the link 10 and which are welded thereto and may if desired be deformed to form a stronger connection and a bulkier mass of metal for long wear.

However, such a construction, although effective and long lasting, is rather heavy and, therefore, there is provided the modification as shown at 14, wherein the cup is apically apertured, as at 18, but which nevertheless fits between the runs of the links 10 and is welded thereto.

As shown in Fig. 4, the cup 14 may be provided with a cross bar 20 at the opposite side of the link 10 from the cup and this will, of course, provide an extremely strong long wearing device.

It is to be noted that the rims 22 for all of the cups so far described are similar in appearance and it is these rims which engage the ground during operation. The rims 22 are seen to be sharp and will, of course, provide a very high degree of frictional engagement with the ground. However, the rims 22 will wear and this wear will be along the dotted lines 24, see Fig. 2. As the elements 12 and 14 wear down along the dotted lines 24, it will be seen that the rims 26 will always stay sharp.

Whereas the above described invention provides an extremely effective and long lasting reinforced tire chain, a less expensive chain, having substantially the same characteristics, can be made by stamping out a sheet of sheet metal into squares or like shapes without waste, and dishing the squares, as indicated at 28, leaving sharp corners 30 providing ground engaging elements. The squares 28 may be apertured but these elements also will remain sharp edged as they wear down.

The squares 28 may be arranged with parallel edges, as shown in Fig. 6, or with edges lying at angles to each other, as shown in Fig 8, and also they may be of different dimensions as, for instance, shown in the offset rectangular form 32.

The degree of dishing of the elements 28 may be varied between an almost flat condition to a heavy spherical form as shown at 34 in Fig. 9.

There are a great many variations of this invention which are possible to be made without departing from the scope of the appended claims and one of these forms is shown in Fig. 5 whereby the cup-shaped element 36 is scalloped at its edges, i. e., along the rim 38.

A great many other shapes are, of course, available to those skilled in the art, once the present invention is clearly understood, but mere shape variation, beyond those here shown, will not add to the novelty or utility of the device.

Having thus described my invention and the advantages thereof, I do not wish to be limited to the details herein disclosed otherwise than as set forth in the claims, but what I claim is:

1. A cross chain for a tire chain comprising a series of connected links including anti-skid elements each secured to a link and each element being in the form of a dish having concavo-convex surfaces, and having ground engaging points connected by curved lines forming the sides of the anti-skid element.

2. A cross chain as set forth in claim 1 wherein successive elements are arranged with one pair of their edges substantially parallel to the corresponding edges of the adjacent element.

3. A cross chain as set forth in claim 1 wherein the sides of the elements are arranged at oblique angles to the center line of the cross chain.

HENRY ST. PIERRE.

REFERENCES CITED

The following references are of record in the file of this patent:

UNITED STATES PATENTS

| Number | Name | Date |
| --- | --- | --- |
| 1,141,735 | Weed | June 1, 1915 |
| 1,187,173 | Putnam | June 13, 1916 |
| 1,363,175 | Benoit | Dec. 21, 1920 |
| 1,536,886 | Freeman | May 5, 1925 |
| 1,635,017 | Sunde | July 5, 1927 |
| 1,651,439 | Boyer | Dec. 6, 1927 |
| 2,057,936 | Centofanti | Oct. 20, 1936 |

FOREIGN PATENTS

| Number | Country | Date |
| --- | --- | --- |
| 368,398 | Great Britain | Mar. 10, 1932 |
| 84,873 | Sweden | Nov. 12, 1935 |